US007672910B1

(12) United States Patent
Kumar

(10) Patent No.: US 7,672,910 B1
(45) Date of Patent: Mar. 2, 2010

(54) SYSTEM AND METHOD FOR PERFORMING NON-LINEAR CONSTRAINED OPTIMIZATION WITH A GENETIC ALGORITHM

(75) Inventor: Rakesh Kumar, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 123 days.

(21) Appl. No.: 11/301,155

(22) Filed: Dec. 12, 2005

(51) Int. Cl.
*G06N 5/00* (2006.01)
(52) U.S. Cl. .......................................... 706/13; 706/45
(58) Field of Classification Search ................... 706/13, 706/45
See application file for complete search history.

(56) References Cited

U.S. PATENT DOCUMENTS 6,327,581 B1 * 12/2001 Platt ............................ 706/12
7,043,462 B2 * 5/2006 Jin et al. ....................... 706/13

OTHER PUBLICATIONS

Barbosa et al. "A new adaptive penalty scheme for genetic algorithms". 2003. Elsevier Inc. pp. 215-251.*
Michalewicz et al. "GENOCOP: A Genetic Algorithm for Numerical Optimization Problems with Linear Constraints". 1996, ACM.vol. 39 Issues 12es, Dec. 1996. pp. 1-24.*

Cheng et al. "Unit Commitment by Lagrangian Relaxation and Genetic Algorithms". 2000, IEEE Transactions on Power Systems, vol. 15, No. 2. May 2000. pp. 707-714.*
Russenchuck. "Mathematical Optimization Techniques for the Design of Permanent Magnet Synchronous Machines Based on Numerical Field Calculation". 1990, IEEE Transacton on Magnetics, vol. 26, No. 2, Mar. 1990. pp. 1-4.*
Russenschuck, S., Mathematical Optimization Techniques for the Design of Permanent Magnet Synchronous Machines Based on Numerical Field Calculation, IEEE Transactions on Magnetics, vol. 26, No. 2, Mar. 1990, pp. 638-641.*

* cited by examiner

*Primary Examiner*—Wilbert L Starks, Jr.
(74) *Attorney, Agent, or Firm*—Lahive & Cockfield, LLP; Kevin J. Canning; John S. Curran

(57) ABSTRACT

An augmented Lagrangian genetic algorithm that may be used to generate solutions for optimization problems subject to linear, bound, and non-linear constraints is discussed. The augmented Lagrangian genetic algorithm uses an adaptive mutation operator to separately handle the linear, and bound constraints, and uses an augmented Lagrangian framework to handle non-linear constraints. The non-linear constraints are handled by creating a sub-problem without the linear and bound constraints and solving the sub-problem using Lagrange parameter estimates and a penalty factor. The exclusion of the linear constraints and boundary constraints from the sub-problem allows the sub-problem to be resolved in a more effective manner than is possible using conventional techniques.

18 Claims, 6 Drawing Sheets

| 10 | 11 | 12 | 13 | 14 | 15 |
|---|---|---|---|---|---|
| Point Vector A | -2.5 | 4 | 1.2 | 8.4 | 9.5 |

| 20 | 21 | 22 | 23 | 24 | 25 |
|---|---|---|---|---|---|
| Point Vector B | 3 | 4 | 1.2 | 8.4 | -6 |

SYSTEM AND METHOD FOR PERFORMING NON-LINEAR CONSTRAINED OPTIMIZATION WITH A GENETIC ALGORITHM

FIELD OF THE INVENTION

The illustrative embodiment relates generally to genetic algorithms, and more particularly to the use of an augmented Lagrangian genetic algorithm that is used to solve optimization problems that include non-linear constraints.

BACKGROUND

Genetic algorithms provide a technique for solving optimization problems that are based on natural selection, the process that drives biological evolution. The optimization problem being solved may include linear constraints and boundary constraints as well as non-linear constraints. A genetic algorithm repeatedly modifies a population of individual solutions in order to create a new population. At each generation, the genetic algorithm selects individuals from the current population to be parents and uses the selected individuals to produce the children for the next generation. Over successive generations, the population "evolves" toward an "optimal solution.

A genetic algorithm uses three main types of operations to create the next population from the current population, namely elites, crossover, and mutation. Elites are individuals selected intact from the current population. Crossover is a technique to swap content from individuals in the current population to create new individuals for the next generation. The third type of operation, the mutation operation is of special interest for the current discussion and is discussed in detail below.

In a genetic algorithm, a mutation operator is a genetic operator used to maintain diversity in a population from one generation to the next. An example of a mutation operator involves the probability that some arbitrary element in a point vector (individual) will be changed from its original state. FIG. 1 illustrates a mutation example in which two elements are randomly chosen and changed to a random value. A point vector A (10) includes elements 11, 12, 13, 14 and 15. A second point vector B (20) is also shown where B is an example of an individual selected by mutating selected elements within point vector A. Point vector B (20) includes elements 21, 22, 23, 24 and 25. Element 11 was mutated into element 21 and Element 15 was mutated into element 25. The values of elements 12, 13 and 14 is the same of that of respective elements 22, 23 and 24. The mutating of the individuals helps prevent premature convergence in the overall population.

FIG. 2 illustrates in a graph 30 the effect of a mutation operation in a conventional unconstrained optimization problem. An individual P2 (34) is generated via a mutation operation on current individual P1 (32) in an unconstrained optimization problem.

One of the difficulties with existing mutation algorithms, such as uniform random mutation and Gaussian mutation, is that while they are very useful in unconstrained optimization, it is very difficult to perform a mutation step in a constrained optimization while maintaining feasibility (a feasible individual represents an acceptable possible solution to the problem being optimized taking into consideration the applicable constraints). For example, in FIG. 3 a graph 40 depicts two linear constraints 46 and 48 and a point P1 (42). Conventional mutation operators that do not take into account the linear constraints 46 and 48 may generate an individual P2 (44) that is located outside the feasible region 50 and therefore not usable as a possible solution to the optimization problem.

A conventional technique for dealing with the generation of solutions to an optimization problem with constraints is to use a penalty method to account for the constraints. A discussion of a common use of the penalty method in optimization problems with linear, bound, and non-linear constraints follows below.

The optimization problem being solved may be represented as:

$$\underset{x}{\text{Minimize }} f(x)$$

Such that $$C_i(x) \leq 0, i = 1 \ldots m$$

$$C_i(x) = 0, i = m+1 \ldots mt$$

$$Ax \leq b$$

$$A_{eq}x = b_{eq}$$

$$LB \leq x \leq UB \quad\quad (A)$$

where the $C_i(x)$ are nonlinear inequality and equality constraints. The integer "m" is the number of nonlinear inequality constraints and mt is the total number of nonlinear constraints. $Ax \leq b$ and $A_{eq}x = b_{eq}$ are linear constraints, LB and UB are lower and upper bounds on the decision variable x.

The most popular approach to perform optimization, subject to constraints, is to formulate a sub-problem with a penalty parameter, and then solve the sub-problem. The sub-problem formulated from the original problem (A) is shown below:

$$\Theta(x, \rho) = f(x) - \rho \left( \sum_{i=1}^{m} \max(0, Ax - b) + \sum_{i=m+1}^{mt} |A_{eq}x - b_{eq}| + \sum_{i=1}^{m} \max(0, c_i(x)) + \sum_{i=m+1}^{mt} |c_i(x)| \right)$$

This sub-problem is solved using a fixed value for $\rho$ or by making $\rho$ dependent on the generation number. Both the linear and the nonlinear constraints are included in the sub-problem, and this is solved subject to the bounds. Bounds are satisfied by choosing appropriate mutation and crossover operators. It should be noted that the linear constraints are included as part of the sub-problem.

Unfortunately, these conventional algorithms suffer from a number of drawbacks when it comes to constrained optimization problems. A difficult aspect of this approach is that it requires a user to choose the right value of $\rho$ for different problems. Additionally, the combination of the linear and nonlinear constraints makes the sub-problem difficult to solve. The linear and bound constraints provide much information that is not used to solve the problem. Also, guessing a value of the penalty parameter $\rho$ is not trivial and often requires some experimentation. If a dynamic penalty parameter is used, there is no adequate way to update this parameter. This type of conventional algorithm to handle constrained optimization also does not scale well as it is inefficient for larger problems that have more decision variables and constraints.

BRIEF SUMMARY

The illustrative embodiment of the present invention uses an augmented Lagrangian genetic algorithm to generate solutions for optimization problems subject to linear, bound, and non-linear constraints. The augmented Lagrangian genetic algorithm uses an adaptive mutation operator to separately handle the linear and bound constraints, and uses an augmented Lagrangian framework to handle non-linear constraints. The adaptive mutation operator generates random mutation direction vectors and random initial step sizes. A mutated individual is generated and moved along a randomly chosen mutation direction vector a distance equal to the initial step size and is compared to the linear and bound constraints. In the event the generated mutated individual is located in an infeasible region, the step size is automatically adjusted to a smaller value and generates another mutated individual along the mutation direction vector. The process iterates until the generated individual is in the feasible region. The non-linear constraints are handled by creating a sub-problem without the linear and bound constraints and solving the sub-problem using Lagrange parameter estimates and a penalty factor. The exclusion of the linear constraints and boundary constraints from the sub-problem allows the sub-problem to be resolved in a more effective manner than is possible using conventional techniques.

In one aspect of the illustrative embodiment of the present invention, in a computing device, a method of performing constrained optimization includes providing a first population of individual solutions for an optimization problem for a modeled system. The optimization problem includes non-linear constraints, linear, and bound constraints. The method also includes the step of separating linear and bound constraints from nonlinear constraints in the original optimization problem. Additionally, the method formulates a sub-problem from the original optimization problem that excludes the linear and bound constraints and includes the non-linear constraints. Further, the method iteratively solves the sub-problem using a penalty parameter and at least one Lagrange parameter estimate in order to solve the original optimization problem. Based on the solution to the sub-problem in every generation, the method generates a second population of individuals.

In another aspect of the present invention, the method of separately solving the sub-problem for linear and bound constraints includes selecting an individual for mutation from the first population and generating programmatically mutation direction vectors and an initial step size. The method also includes the steps of generating programmatically a mutated individual along a randomly chosen mutation direction vector using the initial step size and assessing programmatically whether the mutated individual is in a feasible region. The feasible region encompasses a region of acceptable solutions to the optimization problem considering the linear and bound constraints. The method also mutates another individual along the mutation direction vector using a second step size that is programmatically reduced from the initial step size. The mutation of another individual occurs based on an assessment that the mutated individual is not in a feasible region.

In one aspect of the present invention, a computing apparatus includes a first population of individual solutions for an optimization problem that includes non-linear constraints, linear, and bound constraints. The computing apparatus also includes a genetic algorithm that formulates an approximation of the original optimization problem accounting for the linear and bound constraints, and also solves the sub-problem that includes the non-linear constraints. The sub-problem is solved using Lagrange parameter estimates and a penalty parameter. The apparatus also includes a second population of individual solutions for the optimization problem generated by the genetic algorithm and a storage location for storing the second population.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention uses an augmented Lagrangian genetic algorithm to perform constrained optimization for optimization problems that include linear, bound, and non-linear constraints. The illustrative embodiment separates the non-linear constraints from the linear and bound constraints and handles each separately. The present invention also utilizes information from the linear and bound constraints and formulates a sub-problem with appropriate penalty terms (using a log barrier) and estimated Lagrange parameters that includes the non-linear constraints and excludes the linear and bound constraints. The illustrative embodiment also includes update formulae which guides the algorithm towards a minimum.

Figures 1, 2:
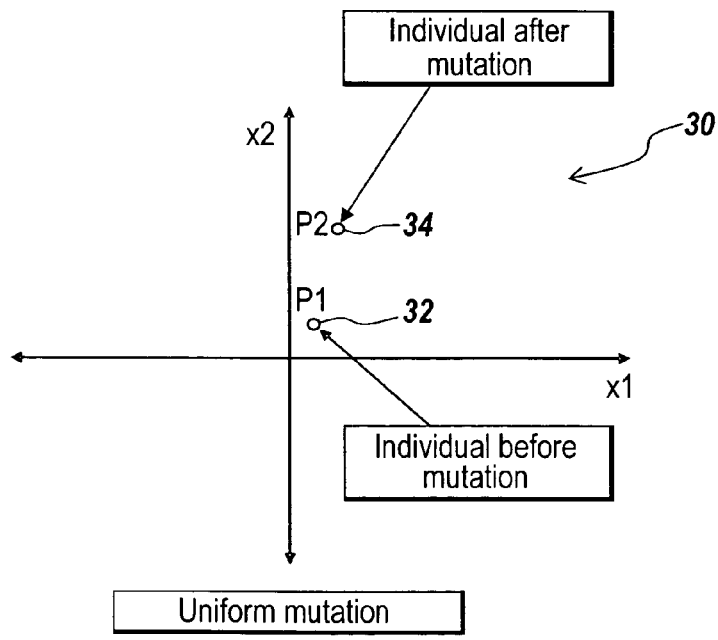
FIG. 1 (prior art) is a block diagram of a conventional mutation example.
FIG. 2 (prior art) is a graph of a conventional mutation operation in an unconstrained optimization.
Figure 3:
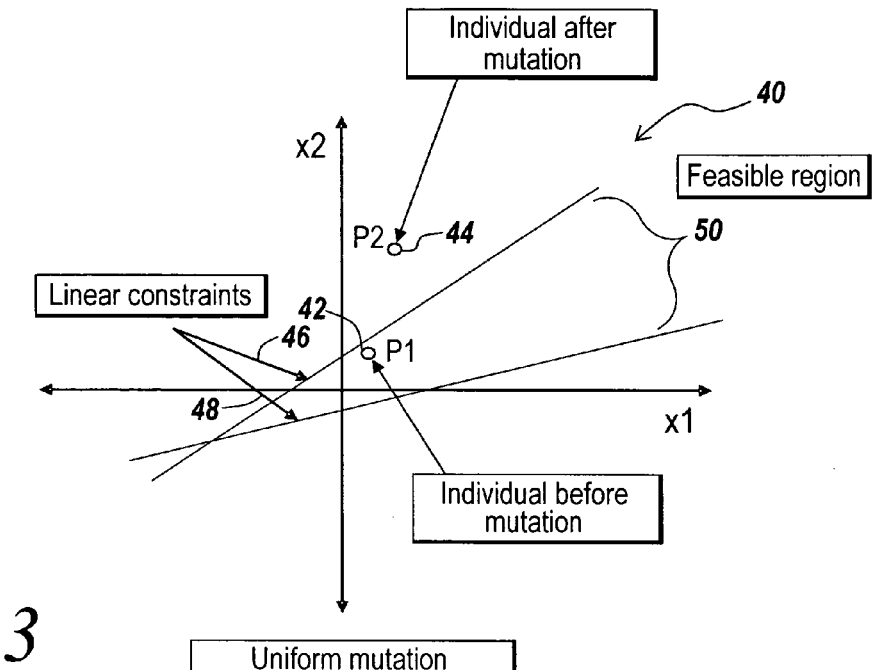
FIG. 3 (prior art) is a graph of the problems presented by attempting a conventional mutation operation in a constrained optimization.
Figure 4:
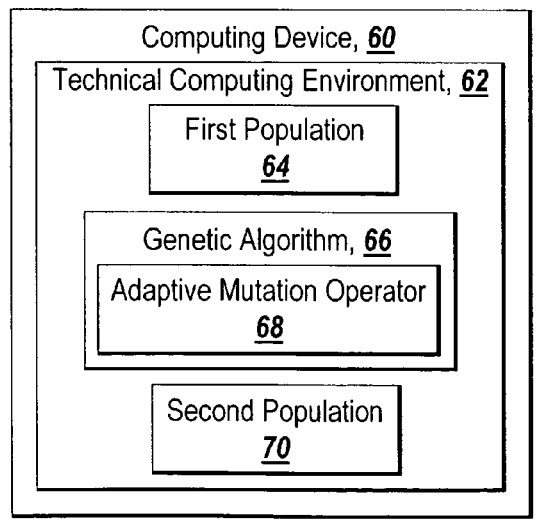
FIG. 4 depicts an environment suitable for practicing the illustrative embodiment of the present invention.

FIG. 4 depicts an environment suitable for practicing the illustrative embodiment of the present invention. A computing device 60 hosts a technical computing environment 62. The computing device 60 may be a PC, workstation, server, laptop, mainframe, PDA or other computing device equipped with a processor and capable of hosting the technical computing environment 62. The computing device 60 may be equipped with a single processor, a multi-core processor, or multiple processors. The processor may be a 32 bit processor, 64 bit processor or some other type of processor capable of executing the instructions required for the present invention. The technical computing environment 62 may be any technical computing environment used to process constrained optimization problems. An exemplary technical computing environment is MATLAB from The MathWorks, Inc. of Natick, Mass.

The technical computing environment 62 includes an augmented Lagrangian genetic algorithm 66 of the present invention. Those skilled in the art will appreciate that the genetic algorithm 66 may be practiced in other applications and environments in addition to the technical computing environment 62. The genetic algorithm 66 separately handles the non-linear constraints by formulating a sub-problem with an appropriate penalty parameter and Lagrangian parameter estimates. Lagrange multipliers (or parameter) estimates are used for as many non-linear constraints as are in the problem. If there is only one non-linear constraint then there will exactly one Lagrange parameter. If there are mt non-linear constraints then there will be exactly mt Lagrange parameters. The formulation of the sub-problem is discussed in detail below. The genetic algorithm 66 includes an adaptive mutation operator 68 that is used to mutate individuals within a first population 64 and to account for the linear and bound constraints in the optimization sub-problem being solved. The operation of the adaptive mutation operator is described further below. The first population 64 may be stored on the computing device 60 or at a location from which it may be accessed by the genetic algorithm 66. Following the processing of the first population by the genetic algorithm 66 a second population 70 holding individual solutions to the optimization problem is created. The second population 70 may also be stored on the computing device 60 or at a different location accessible to the genetic algorithm 66.

It will be appreciated by those skilled in the art that in alternate implementations, the genetic algorithm 66 may run in a virtualized environment such as in a virtual machine. Multiple virtual machines running the code may be resident on a single processor. Also, hardware acceleration may be used and all or a portion of the code may run on a FPGA or an ASIC.

Figure 5:
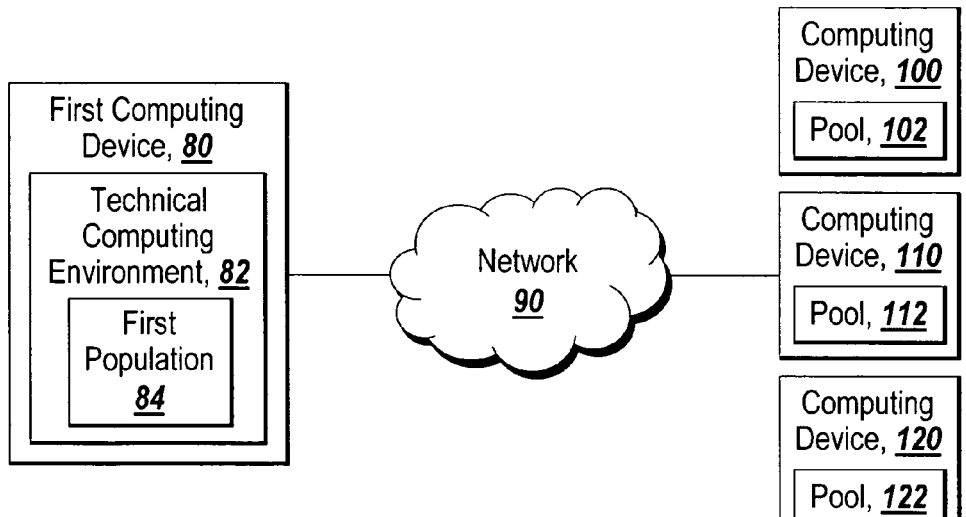
FIG. 5 depicts an alternate distributed environment suitable for practicing the illustrative embodiment of the present invention.

The illustrative embodiment of the present invention may also be practiced in a distributed or parallel environment. For example, FIG. 5 depicts an alternate distributed environment suitable for practicing the illustrative embodiment of the present invention. A first computing device 80 communicates over a network 90 with multiple computing devices 100, 102, and 104. The network 90 may be a Wide Area Network (WAN), Local Area Network (LAN), the Internet, an intranet or some other type of network over which the multiple computing devices 100, 110 and 120 can communicate with the first computing device 80. The genetic algorithm 66 may first perform a mutation operation on the first population that accounts for linear and bound constraints. The genetic algorithm 66 formulates a sub-problem that includes the non-linear constraints of the optimization problem. The formulated sub-problem is then transmitted over the network 90 to the multiple computing devices 100, 110 and 120. The multiple computing devices 100, 110 and 120 may then each attempt to solve the sub-problem in parallel. Other distributed and parallel architectures including thin-client and server-based computing architectures for practicing the present invention will be apparent to those skilled in the art. Similarly, it will be appreciated that various components discussed herein may be virtualized without departing from the scope of the present invention.

The genetic algorithm 66 creates a sub-problem that includes the non-linear constraints, Lagrangian estimate parameters and a suitable penalty factor. The sub-problem excludes the linear constraints and boundary constraints which are explicitly dealt with separately. In one implementation, the linear constraints and boundary constraints are separately handled by the adaptive mutation operator 68.

The adaptive mutation operator 68 generates mutated points in a feasible region defined by linear and bound constraints. The adaptive mutation operator 68 generates random directions called mutation direction vectors and uses an initial step size parameter to generate individuals along mutation direction vectors. The step size is changed throughout the optimization and is not fixed. The step size goes to zero towards the end of the optimization. A small number of mutation direction vectors are initially generated. The number of directions increases as the step size parameter decreases.

The algorithm for the adaptive mutation operator may be represented as follows:

Step 1: Let "Delta" be the current step size calculated as follows

If generation <=1
   Delta=1;
else
   If successful_last_generation
   Delta=max(1, Delta_last*4)
   else
   Delta=Delta_last/4
   end
end Step 2: Generate a set "D" which consist of minimum number of mutation directions (2*numberOfVariables).
   Generate a lower triangular matrix "B" whose diagonal elements are +/−1/sqrt(Delta), and other elements are integers between +1/sqrt(Delta) and −1/sqrt(Delta) (closed set). The columns of this matrix are linearly independent direction vectors because B is a lower triangular matrix.
   Randomly permute the rows and columns of B (The effect is to randomize direction vectors)
   Take the negative and positive of the set B i.e., [B −B] to produce the direction set D For each individual in the population to be mutated, repeat step 3 and 4

Step 3: Identify all the binding linear and bound constraints at the current individual which will form the current active-set of constraints. Find the set of tangent cone generators "T" of the active linear and bound constraints. Add the negative and positive of the tangent cone generators [T −T] to the set of mutation directions D.
   Replace D with [B −B] to represent mutation directions as [T −T B −B] which may be referred to as set M.

Step 4: For each mutation direction in the set, perform the following:
   Calculate a point "xtrial" along direction $m_i \in M$ at a random distance.
   If isfeasible(xtrial)
   mutant=xtrial
   Return from the function
   else
   i=i+1
   end It should be appreciated that it is possible that a point may not mutated because none of the mutation directions with the current step size produced a feasible point. However, the adaptive mutation operator does produce a feasible point for a step size Delta <=eps (where eps is a small positive number close to zero) using the mutation vector directions.

Figure 6:
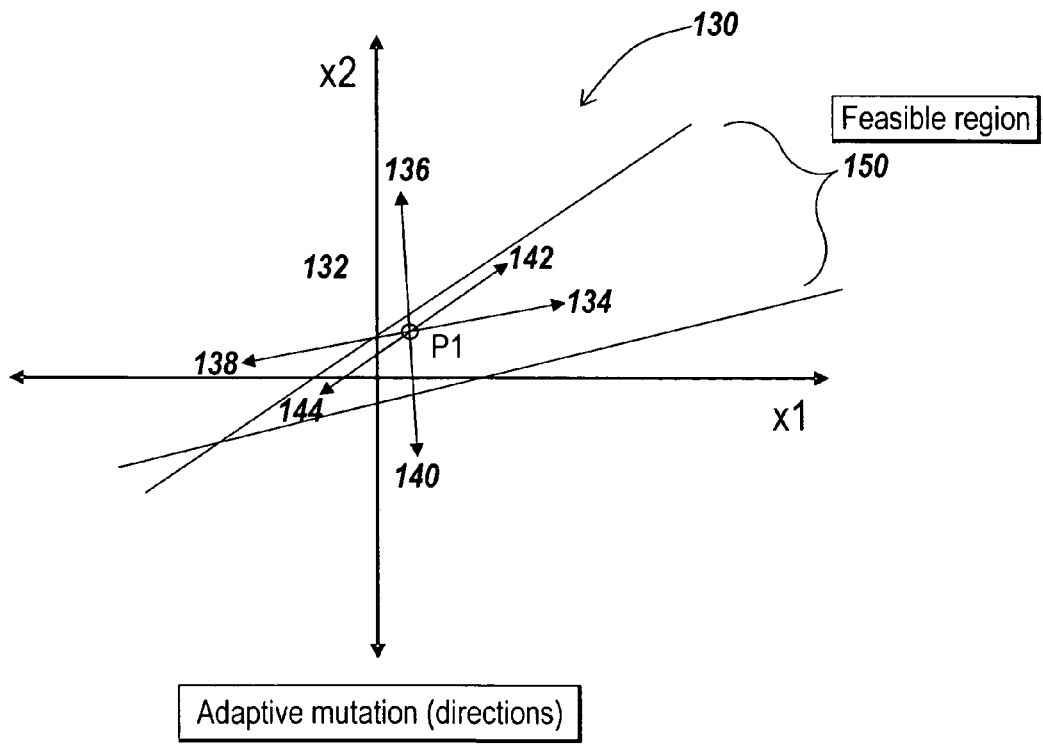
FIG. 6 is a graph depicting the use of mutation vector directions in a constrained operation by the illustrative embodiment of the present invention.

FIG. 6 shows a graph 130 showing the use of the adaptive mutation operator 68 to create mutation vector directions for a point P1 (132). The application of the adapter mutation operator 68 generates four mutation vector directions number 134, 136, 138 and 140 for point P1 (132) (generated from the step 2 above). Also, one active constraint is determined from step 3, which adds two more mutation vector directions 142 and 144. The adaptive mutation operator of the present invention uses direction vectors where a majority of the elements are nonzero. This is more effective than conventional mechanisms of perturbing only a couple of dimensions. Once the mutation vector directions 134, 136, 138, 140, 142, and 144 are generated, the adaptive mutation operator calculates the trial mutated individuals discussed in step 4 above.

It will be appreciated by those skilled in the art that the number of mutation directions depends on the step size. The number of directions can theoretically approach infinity as the step size parameter approaches zero. Because the adaptive mutation operator supports a large number of mutation direction vectors, the new population being created will have a greater variety of mutated individuals than was previously possible with conventional mechanisms for performing mutations in a genetic algorithm.

The genetic algorithm handles the non-linear constraints by formulating a sub-problem which includes the non-linear constraints but excludes the linear and bound constraints. The sub-problem is formulated by combining the fitness function from the genetic algorithm and the nonlinear constraint function using Lagrange and penalty parameters. A sequence of such optimization sub-problems are minimized using the genetic algorithm such that the linear and bound constraints are satisfied.

The sub-problem is formulated as:

$$\Theta(x, \lambda, s, \rho) = f(x) - \sum_{i=1}^{m} \lambda_i s_i \log(s_i - c_i(x)) + \sum_{i=m+1}^{mt} \lambda_i c_i(x) + \frac{\rho}{2} \sum_{i=m+1}^{mt} c_i(x)^2$$

where the components $\lambda_i$ of the vector $\lambda$ are nonnegative and are known as Lagrange multiplier estimates. The elements $s_i$ of the vector s are nonnegative shifts, and $\rho$ is the positive penalty parameter. The algorithm begins by using an initial value for the penalty parameter. The $\lambda$ drives the solution towards the minimum. The use of the log with the constraint provides stability near the boundary.

The genetic algorithm 66 minimizes a sequence of the sub-problem, which is an approximation to the original problem (A). When the sub-problem is minimized to a required accuracy and satisfies feasibility conditions, the Lagrange estimates are updated. Otherwise, the penalty parameter is increased by a penalty factor. This results in a new sub-problem formulation and minimization sub-problem. These steps are repeated until the stopping criteria are met.

Figure 7:
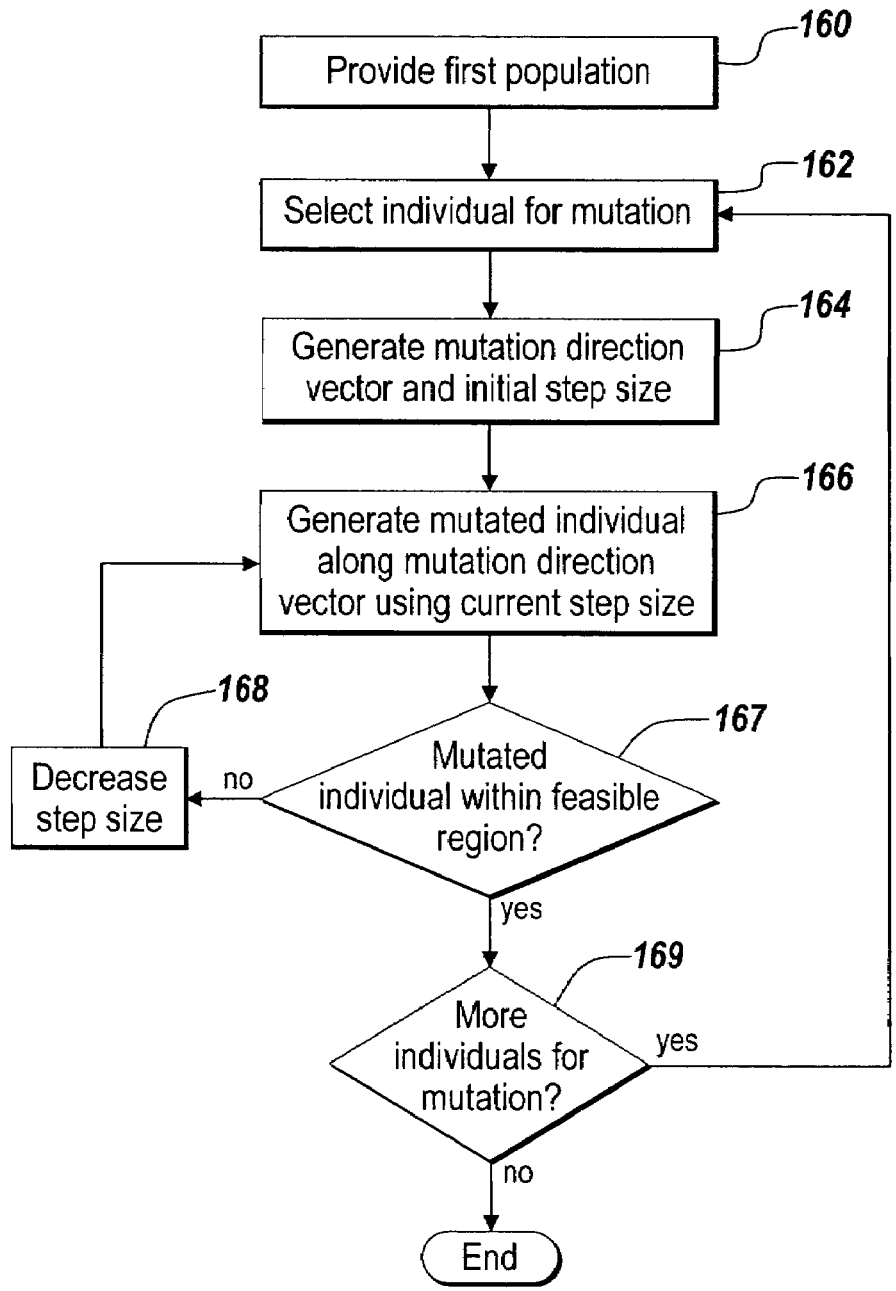
FIG. 7 is a flowchart of the sequence of steps followed by the illustrative embodiment of the present invention to use the adaptive mutation operator.

FIG. 7 depicts the sequence of steps followed by the illustrative embodiment of the present invention to mutate individuals in a constrained optimization problem for a modeled system using the adaptive mutation operator of the present invention. The sequence begins with the creation of the first population (step 160). An individual in the first population is then selected for mutation (step 162) and the adaptive mutation operator generates mutation direction vectors and an initial step size (step 164). The adaptive mutation operator then generates a mutated individual along a randomly chosen mutation direction vector using the initial/current step size (step 166). The mutated individual is then automatically examined by the adaptive mutation operator to determine whether the mutated individual is in a feasible region (step 167).

If the mutated individual is not located in a feasible region, the step size is automatically decreased (step 168) and the process iterates and generates another mutated individual along the mutation direction vector (step 166). In one implementation, the step size may be cut in half with each iteration. It will be appreciated by those skilled in the art that the step size may be reduced by other amounts such as a third or a quarter without departing from the scope of the present invention. If it is determined that the mutated individual is located in a feasible region (step 167), the adaptive mutation operator checks to see if more individuals have been selected for mutation (step 169). If more individuals are being mutated, the process repeats and the next individual is selected for mutation (step 162) and mutation direction vectors and a new initial step size (step 164) are generated. If there are no more individuals to be mutated, the process ends and the genetic algorithm can examine the overall fitness of the newly created population as a solution for the optimization problem.

Figure 8:
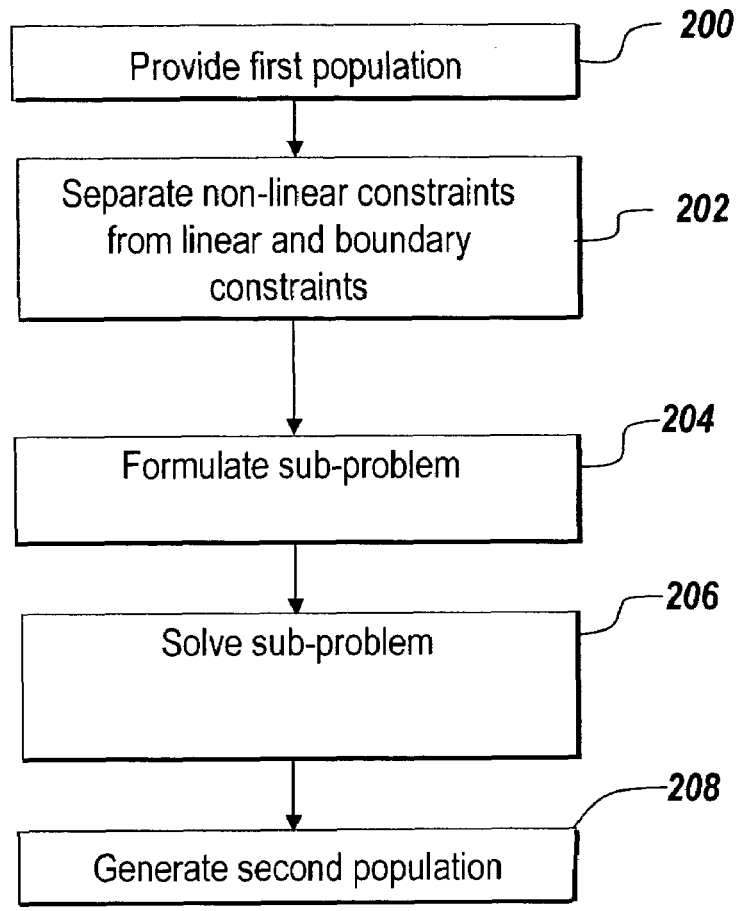
FIG. 8 is a flowchart of the sequence of steps followed by the illustrative embodiment of the present invention to use the perform constrained optimization.

FIG. 8 depicts the sequence of steps followed by the illustrative embodiment of the present invention to perform constrained optimization where the optimization problem includes non-linear, linear, and bound constraints. The sequence begins with the providing of a first population (step 200). The linear and bound constraints are then separated from non-linear constraints (step 202). A sub-problem is then formulated (step 204) and solved (step 206). In one implementation, the sub-problem is solved through the use of the adaptive mutation operator discussed above. The execution of the genetic algorithm results in the generation of a second population (step 208).

Figure 9:
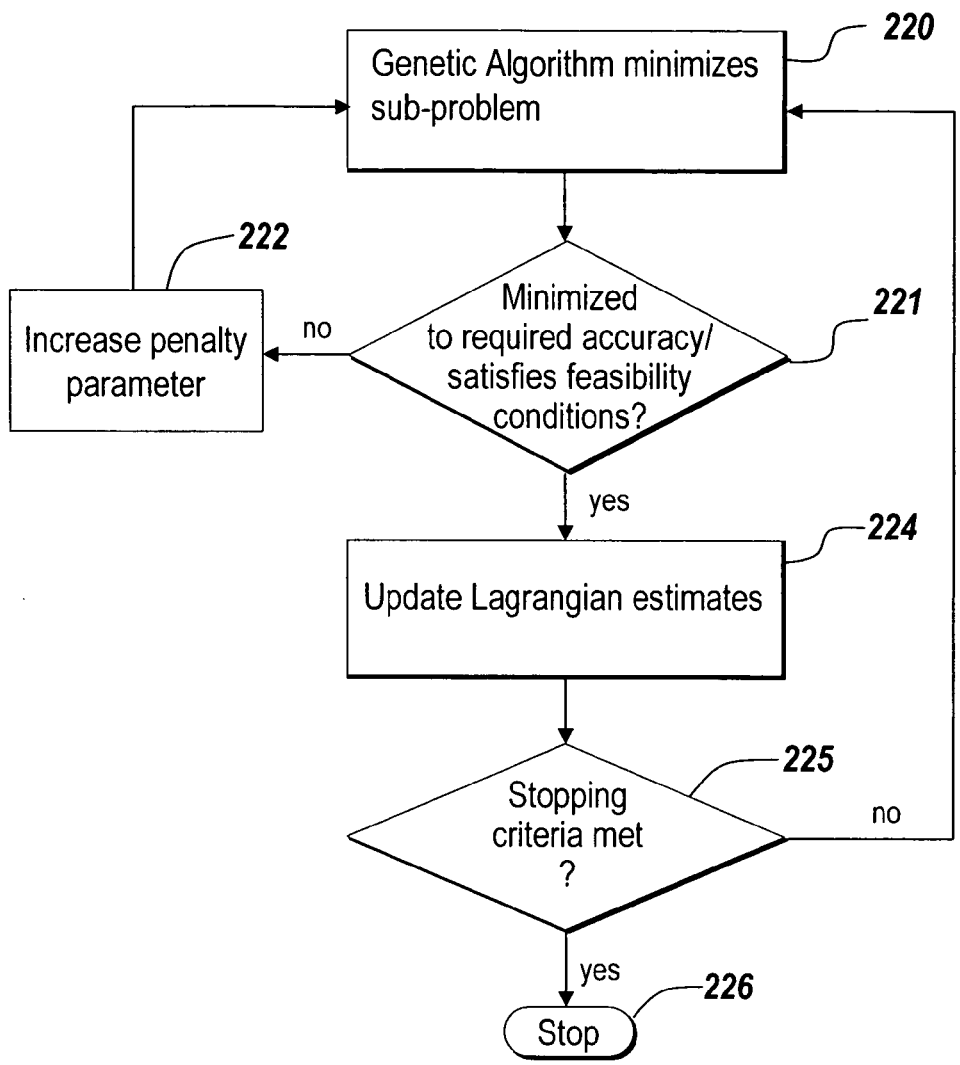
FIG. 9 is a flowchart of the sequence of steps followed by the illustrative embodiment of the present invention to solve a sub-problem for the constrained optimization of FIG. 8.

FIG. 9 depicts the solving of the sub-problem in more detail. The sequence begins when the Lagrangian genetic algorithm 66 minimizes the sub-problem (step 220). The sub-problem is checked to see if it has been minimized to a required accuracy and satisfies feasibility conditions (step 221). If it has/does not, the penalty parameter is increased (step 222) which results in a new sub-problem which is then minimized again (step 220). If the minimization does satisfy the accuracy and feasibility requirements (step 221), the Lagrangian estimates are updated (step 224). If one or more stopping criteria are met (step 225), the sequence ends (step 226). If no stopping criteria are met, the process iterates and the genetic algorithm minimizes the new sub-problem again with new Lagrange and penalty parameters.

As noted above, mutation is one of three main types of operations used to create the next population from a current population with the other two types of operations being selection, where particular individuals named elites are selected for the new population intact, and crossover, where parts of separate individuals are combined to create new individuals. It will be appreciated that the new mechanism for performing mutation using the adaptive mutation operator of the present invention may be combined with conventional selection and crossover techniques to create new populations.

Although the discussion of the step size reduction process made reference to programmatically reducing the step size by a percentage value in those situations where it is detected that the mutated individual is in an infeasible region, those skilled in the art will recognize that other mechanisms for reducing the step size are possible within the scope of the present invention. For example, where it is determined that the mutated individual is located on the mutation direction vector in an infeasible region, the mutated individuals position may be automatically adjusted back to a point of intersection of the constraint and the mutation direction vector. Alternatively, the mutated individual's location may be adjusted from a position in an infeasible region back along the mutation direction vector to an offset inside the constraint along the mutation direction vector. These and other similar adjustment mechanisms are considered within the scope of the present invention.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a computing device hosting a technical computing environment used to process constrained optimization problems, a computer-implemented method of performing constrained optimization, comprising:
   providing a first population of a plurality of individuals for an optimization problem for a modeled system, the optimization problem including non-linear constraints, linear constraints and bound constraints, the individuals being individual solutions to the optimization problem;
   formulating a sub-problem from the optimization problem that excludes the linear and bound constraints and includes the non-linear constraints;
   solving, using the computing device, the sub-problem using a penalty parameter and at least one Lagrange parameter estimate to solve the optimization problem;
   generating, based on the solution to the sub-problem, a second population of individuals;
   storing the second population in a computer-readable storage medium, the second population available for use with the modeled system;
   minimizing, using the computing device, a sequence of the sub-problem to an approximate solution;
   determining, using the computing device, whether the approximate solution to the sub-problem is minimized to a pre-determined accuracy and whether the approximate solution to the sub-problem satisfies a feasibility condition;
   increasing, using the computing device, said at least one Lagrangian parameter estimate based on a determination that the approximate solution to the sub-problem is minimized to the pre-determined accuracy and that the approximate solution to the sub-problem satisfies the feasibility condition; and
   increasing, using the computing device, the penalty parameter in the sub-problem based on a determination that the sub-problem is not minimized to the pre-determined accuracy or that the sub-problem does not satisfy the feasibility condition.

2. The method of claim 1, further comprising:
   repeating until a stopping criteria is achieved the steps of:
      minimizing a sequence of the sub-problem to an approximate solution;
      determining whether the approximate solution to the sub-problem is minimized to a pre-determined accuracy and whether the approximate solution to the sub-problem satisfies a feasibility condition; and
      increasing, based on a determination that the approximate solution to the sub-problem is minimized to a pre-determined accuracy and that the approximate solution to the sub-problem satisfies a feasibility condition, said at least one Lagrange parameter estimate.

3. The method of claim 1 wherein the at least one Lagrangian parameter estimate is a multiplier for a linear constraint.

4. The method of claim 1 wherein the at least one Lagrangian parameter estimate is a multiplier for a bound constraint.

5. The method of claim 1, further comprising separately solving for the linear and bound constraints, the solving including:
   selecting an individual for mutation from the first population;
   generating programmatically an initial step size;
   generating programmatically a plurality of mutation direction vectors based on the linear and bound constraints, the plurality of mutation direction vectors extending from a plotted location representing the individual selected for mutation generating programmatically a mutated individual along a randomly chosen one of the plurality of mutation direction vectors a distance equal to the initial step size from the plotted location representing the individual selected for mutation;
   assessing programmatically whether the mutated individual is in a feasible region, the feasible region representing a region encompassing acceptable solutions to the optimization problem considering the linear and bound constraints, wherein the assessing includes:
      storing the mutated individual as part of second population in a computer-readable medium based on an assessment that the mutated individual is in a feasible region; or
      based on an assessment that the mutated individual is not in a feasible region, iteratively mutating a different mutated individual along the chosen mutation direction vector using a step size programmatically reduced from the initial step size and assessing whether the different mutated individual is in the feasible region until a different mutated individual is assessed to be in the feasible region, the reduced step size based on the linear and bound constraints; and
      storing the different mutated individual as part of a second population in a computer-readable medium based on an assessment that the different mutated individual is in a feasible region.

6. The method of claim 5, further comprising:
   generating a plurality of mutation direction vectors after selecting the individual for mutation; and generating a different mutated individual along each of the plurality of mutation direction vectors using the initial step size.

7. The method of claim 6, further comprising:
assessing programmatically each mutated individual generated along the plurality of mutation direction vectors to determine whether each mutated individual is in a feasible region, the feasible region representing an acceptable solution to the optimization problem considering the linear and bound constraints;
identifying at least one mutated individual that is not in a feasible region on its selected mutation direction vector;
for each of the identified individuals, mutating another individual along the selected mutation direction vector using a second step size programmatically reduced from the initial step size.

8. The method of claim 5, further comprising:
based on a programmatic assessment that the individual mutated using the second step size is not in a feasible region, mutating another individual along the mutation direction vector using a different step size programmatically reduced from the step size used in the previous mutation.

9. The method of claim 5, further comprising:
generating programmatically, in response to the generation of a reduced step size, at least one new mutation direction vector and at least one new mutated individual for the new mutation direction.

10. The method of claim 1 wherein the sub-problem is solved in parallel using a plurality of computing devices.

11. A computing apparatus hosting a technical computing environment used to process constrained optimization problems, the computing apparatus comprising:
a processor configured to process:
a first population of individual solutions for an optimization problem for a modeled system that includes non-linear constraints, linear constraints and bound constraints,
a genetic algorithm that solves a sub-problem that includes the non-linear constraints and excludes the linear constraints and bound constraints, the sub-problem solved using at least one Lagrangian parameter estimate and a penalty parameter, wherein the genetic algorithm minimizes a sequence of the sub-problem to an approximate solution and determines whether the approximate solution to the sub-problem is minimized to a pre-determined accuracy and whether the approximate solution to the sub-problem satisfies a feasibility condition, wherein the genetic algorithm increases the at least one Lagrangian parameter estimate based on a determination that the approximate solution to the sub-problem is minimized to the pre-determined accuracy and that the approximate solution to the sub-problem satisfies the feasibility condition, and wherein the genetic algorithm increases the penalty parameter in the sub-problem based on a determination that the sub-problem is not minimized to the pre-determined accuracy or that the sub-problem does not satisfy the feasibility condition, and
a second population of individual solutions for the optimization problem generated by the genetic algorithm; and
a computer-readable storage medium for storing the second population, the second population available for use with the modeled system.

12. In a computing device hosting a technical computing environment used to process constrained optimization problems, a computer-readable storage medium holding computer-executable instructions for performing constrained optimization, the instructions comprising:
instructions for providing a first population of a plurality of individuals for an optimization problem for a modeled system, the optimization problem including non-linear constraints, linear constraints and bound constraints; the individuals being individual solutions to the optimization problem;
instructions for formulating a sub-problem from the optimization problem that excludes the linear constraints and bound constraints and includes the non-linear constraints;
instructions for solving the sub-problem using a penalty parameter and at least one Lagrangian parameter estimate to solve the optimization problem;
instructions for generating, based on the solution to the sub-problem, a second population of individuals;
instructions for storing the second population in a computer-readable storage medium, the second population available for use with the modeled system;
instructions for minimizing a sequence of the sub-problem to an approximate solution;
instructions for determining whether the approximate solution to the sub-problem is minimized to a pre-determined accuracy and whether the approximate solution to the sub-problem satisfies a feasibility condition;
instructions for increasing said at least one Lagrangian parameter estimate based on a determination that the approximate solution to the sub-problem is minimized to the pre-determined accuracy and that the approximate solution to the sub-problem satisfies the feasibility condition; and
instructions for increasing the penalty parameter in the sub-problem based on a determination that the approximate solution to the sub-problem is not minimized to the pre-determined accuracy or that the approximate solution to the sub-problem does not satisfy the feasibility condition.

13. The medium of claim 12, wherein the instructions further comprise:
instructions for repeating until a stopping criteria is achieved the steps of:
minimizing a sequence of the sub-problem to an approximate solution;
determining whether the approximate solution to the sub-problem is minimized to a pre-determined accuracy and whether the approximate solution to the sub-problem satisfies a feasibility condition; and
increasing, based on a determination that the approximate solution to the sub-problem is minimized to a pre-determined accuracy and that the approximate solution to the sub-problem satisfies a feasibility condition, said at least one Lagrangian parameter estimate.

14. The medium of claim 12, wherein the instructions further comprise:
instructions for selecting an individual for mutation from the first population;
instructions for generating programmatically an initial step size;
instructions for generating programmatically a plurality of mutation direction vectors based on the linear and bound constraints, the plurality of mutation direction vectors extending from a plotted location representing the individual selected for mutation;

instructions for generating programmatically a mutated individual along a randomly chosen mutation direction vector a distance equal to the initial step size from the plotted location representing the individual selected for mutation;

instructions for assessing programmatically whether the mutated individual is in a feasible region, the feasible region representing a region encompassing acceptable solutions to the optimization problem considering the linear and bound constraints, wherein the assessing includes:

instructions for storing the mutated individual as part of second population in a computer-readable medium based on an assessment that the mutated individual is in a feasible region; or instructions for, based on an assessment that the mutated individual is not in a feasible region, mutating a different mutated individual along the chosen mutation direction vector using a step size programmatically reduced from the initial step size and assessing whether the different mutated individual is in the feasible region until a different mutated individual is assessed to be in the feasible region, the reduced step size based on the linear and bound constraints; and storing the different mutated individual as part of a second population in a computer-readable medium based on an assessment that the different mutated individual is in a feasible region.

15. The medium of claim 14, wherein the instructions further comprise:

instructions for generating a plurality of mutation direction vectors after selecting the individual for mutation; and instructions for generating a different mutated individual along each of the plurality of mutation direction vectors using the initial step size.

16. The medium of claim 15, wherein the instructions further comprise:

instructions for assessing programmatically each mutated individual generated along the plurality of mutation direction vectors to determine whether each mutated individual is in a feasible region, the feasible region representing an acceptable solution to the optimization problem considering the linear and bound constraints;

instructions for identifying at least one mutated individual that is not in a feasible region on its selected mutation direction vector;

for each of the identified individuals, instructions for mutating another individual along the selected mutation direction vector using a second step size programmatically reduced from the initial step size.

17. The medium of claim 14, wherein the instructions further comprise:

instructions for mutating another individual along the chosen mutation direction vector using a different step size programmatically reduced from the step size used in the previous mutation based on a programmatic assessment that the individual mutated using the second step size is not in a feasible region.

18. The medium of claim 14, wherein the instructions further comprise:

instructions for generating programmatically, in response to the generation of a reduced step size, at least one new mutation direction vector and at least one new mutated individual for the new mutation direction.

\* \* \* \* \*